United States Patent [19]

Oshita

[11] Patent Number: 4,547,947

[45] Date of Patent: Oct. 22, 1985

[54] METHOD FOR PRODUCING A NONDIRECTIONAL PEN

[75] Inventor: Katuzi Oshita, Tokyo, Japan

[73] Assignee: The Sailor Pen Co., Ltd., Tokyo, Japan

[21] Appl. No.: 588,801

[22] Filed: Mar. 12, 1984

[30] Foreign Application Priority Data

Mar. 29, 1983 [JP] Japan .................................. 58-51672

[51] Int. Cl.$^4$ .............................................. B23P 17/00

[52] U.S. Cl. .................................. 29/412; 29/157 C; 29/441 BP; 29/445; 29/DIG. 48; 401/179; 401/261; 401/265

[58] Field of Search .................... 29/441 BP, 412, 445, 29/157 C; 228/160; 401/179, 261, 265

[56] References Cited

U.S. PATENT DOCUMENTS 3,099,082 7/1963 Henriksen .................. 29/441 BP X 3,678,565 7/1972 Linz et al. ...................... 29/441 BP

*Primary Examiner*—Mark Rosenbaum

*Assistant Examiner*—Leonard S. Selman

*Attorney, Agent, or Firm*—Frishauf, Holtz, Goodman & Woodward

[57] ABSTRACT

A method for producing a nondirectional pen includes the steps of drawing a solid metal rod to form a pen blank having three or more radial blade sections extending along the length of the pen blank and equally spaced angularly away from one another; cutting the pen blank into pen bodies having a predetermined length; shaping the forward end of each of the pen bodies into a substantially conical configuration; welding a pen point ball to the tip of the pen body; slotting the pen body from its tip to a predetermined depth through the pen point ball to form longitudinal slots; and plastically deforming the pen body to close the slots.

2 Claims, 7 Drawing Figures

METHOD FOR PRODUCING A NONDIRECTIONAL PEN

BACKGROUND OF THE INVENTION

1. Field of the Invention

The present invention relates to an improved method for producing a nondirectional pen.

2. Description of the Prior Art

The conventional fountain pen devices must be used to write only in a predetermined direction. To overcome such a problem, there has been proposed a nondirectional pen including three radial blade sections equally angularly spaced away from one another and being generally formed into a conical shape with the tip thereof including a pen point ball welded thereto. Sucn a non-directional pen is produced by providing three of substantially triangle-shaped plates, bending each of the triangle-shaped plates along the length thereof into a V-shape with an angle of 120 degrees and spot-welding these triangle-shaped bent plates at their back faces. This process requires many steps resulting in increased manufacturing cost. Furthermore, there is also a problem in that upon spot-welding, the plates are frequently misaligned with one another to provide a rejected product. The resulting pen has its poor ink-holding ability since the ink is transferred to the tip of the pen along the bottom of the V-shaped groove of the respective bent plate. If the pen is placed without its cap for a very short time, the supply of ink may immediately be stopped. This problem can be solved by providing a particular ink-holding means in the pen. However, this solution adds at least one further working step to the previous working steps.

SUMMARY OF THE INVENTION

It is therefore an object of the present invention to provide an improved method for producing a nondirectional pen which can continuously supply the ink to the tip thereof even if the pen is left as it is.

Another object of the present invention is to provide an improved method for producing such a nondirectional pen by the use of a simplified process which is reduced in the number of steps.

In one aspect of the present invention, the method for producing a nondirectional pen comprises the steps of drawing a solid metal rod to form a pen blank having three or more radial blade sections extending along the length of said pen blank and equally spaced angularly away from one another; cutting said pen blank into pen bodies having a predetermined length; shaping the forward end of each of said pen bodies into a substantially conical configuration; welding a pen point ball to the tip of said pen body; slotting said pen body from its tip to a predetermined depth through said pen point ball to form longitudinal slots each extending from a V-shaped groove defined between each adjacent blade sections to a depth in the corresponding blade section; holding said pen body in such a state that said longitudinal slots are closed and then grinding said pen point ball into a symmetrical shape about the pen point of said pen body; and plastically deforming said pen body such that the slots formed in said pen point ball will be in their closed condition.

Other objects and features of the present invention will be apparent from reading the following description in connection with the accompanying drawings.

DETAILED DESCRIPTION OF PREFERRED EMBODIMENTS

Figure 1:
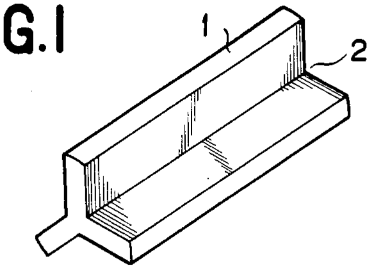
FIG. 1 is a perspective view of a pen body of a predetermined length cut from a pen blank after it has been drawn.

Referring first to FIG. 1, there is herein shown a pen body provided by drawing a solid rod of stainless steel having a diameter equal to about 4 millimeters and then cutting the drawn rod into a predetermined length. The pen body includes three radial blade sections 1 extending along the length of the pen body and equally angularly spaced away from one another by 120 degrees, the thickness of each of the blade sections being equal to about one millimeter. A V-shaped groove 2 opened through 120 degrees is defined between each adjacent blade sections 1.

Figure 2:
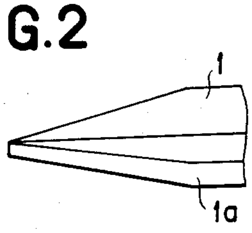
FIG. 2 is a side view showing the pen body after the forward end thereof has been shaped into a conical shape.

As shown in FIG. 2, the forward end of each of the pen bodies is ground into a substantially conical shape to provide outer arched surfaces 1*a*. At the same time, the tip of the pen body is shaped to provide a semi-spherical recess of about one millimeter diameter.

Figure 3:
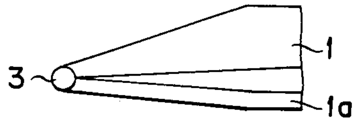
FIG. 3 is a side view showing the pen body after a pen point ball has been welded to the shaped tip of the pen body.

In the next step, as shown in FIG. 3, a pen point ball 3 of carbide alloy having the same diameter as that of the semi-spherical recess formed in the tip of the pen body is welded in said recess to provide the outline of the pen.

Figure 4:
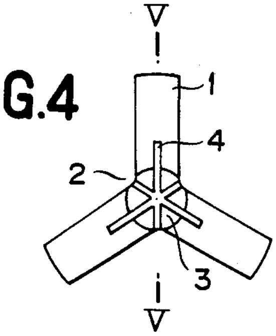
FIG. 4 is a front view of the pen body after it has been slotted.
Figure 5:
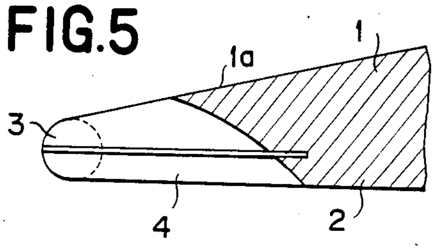
FIG. 5 is a sectional view taken along a line V—V in FIG. 4.
Figure 6:
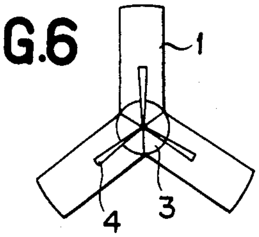
FIG. 6 is a view similar to FIG. 4, showing the pen body in such a state that the longitudinal slots are closed.

In the subsequent step, three intersecting slots 4 are formed in the pen body from the pen point ball on the tip thereof through a predetermined longitudinal extent with each of these slots being disposed to extend from the bottom of the V-shaped groove 2 between each adjacent blade sections 1 to a depth in the corresponding blade section on the opposite side, as shown in FIGS. 4 and 5. Each of the longitudinal slots 4 serves not only as an ink passageway for supplying the ink to the pen point ball 3, but also as means for causing the pen to be flexible to provide a good writing feel and to promote the supply of ink. Each of the longitudinal slots 4 is deeper near the V-shaped groove 2 as shown in FIG. 5 since the ink is transferred to the pen point ball 3 along the V-shaped groove 2. Each of these slots 4 may be of a transverse width in the range of 0.1 to 0.15 millimeters which would provide a poor capillary action and prevent the smooth run of the pen on the paper face. Therefore, the slots 4 will be closed in the final step described below. Under such a condition that all the slots are closed in the final step, the pen point ball 3 does not has its true semi-spherical shape. As shown in FIG. 6, therefore, the pen body is firmly held as by a chuck with the slots 4 being closed. In this state, the pen point ball and optionally surrounding pen tip portion are ground as by a hard whetstone to provide a symmetrical configuration about the pen tip portion. This ensures that the pen has its nondirectional property.

The edges of the slots 4 may have fine burrs at the slotting and grinding steps. It is therefore preferred that when the pen body is firmly held as by a chuck with all the slots being opend as shown in FIG. 4, the edges of the slots 4 are chamferred as by a soft whetstone with a radius of curvature equal to about 0.02 R. This also ensures the smooth run of the pen on the paper face.

Figure 7:
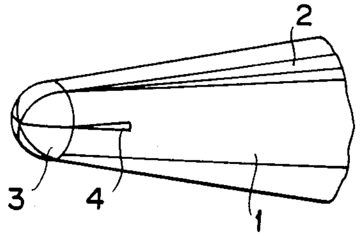
FIG. 7 is a perspective view showing the completed pen.

In the final step, as shown in FIG. 7, the pen body is plastically deformed to close the slots 4 as by a press to provide a finished pen. This finished pen is then mounted on a three-pronged pen core with the resulting assembly being mounted in a pen holder to provide a fountain pen.

Although the embodiments of the present invention have been described as to the pen body having three blade sections in connection with the drawings, the present invention may be applied to any pen body having four or more blade sections.

What is claimed is:

1. A method for producing a nondirectional pen, comprising the steps of drawing a solid metal rod to form a pen blank having three or more radial blade sections extending along the length of said pen blank and equally spaced angularly away from one another; cutting said pen blank into pen bodies having a predetermined length; shaping the forward end of each of said pen bodies into a substantially conical configuration; welding a pen-point ball to the tip of said pen body; slotting said pen body from its tip to a predetermined depth through said pen point ball to form longitudinal slots each extending from a V-shaped groove defined between each adjacent blade sections to a depth in the corresponding blade section; holding said pen body in such a state that said longitudinal slots are closed and then grinding said pen point ball into a symmetrical shape about the pen point of said pen body; and plastically deforming said pen body such that the slots formed in said pen point ball will be in their closed condition.

2. A method for producing a nondirectional pen as defined in claim 1, further including the step of holding said pen body in such a state that the slots formed therein are opened and then chamfering the edges of at least the slots formed in the pen point ball.

* * * * *